(12) United States Patent
Chett et al.

(10) Patent No.: US 12,182,300 B2
(45) Date of Patent: Dec. 31, 2024

(54) SYSTEMS AND METHODS FOR POLICY MANAGEMENT

(71) Applicant: Collibra Belgium BV, Brussels (BE)

(72) Inventors: Hafeesmon Chett, Bristow, VA (US); James B. Cushman, II, Longboat Key, FL (US)

(73) Assignee: Collibra Belgium BV, Brussels (BE)

( * ) Notice: Subject to any disclaimer, the term of this patent is extended or adjusted under 35 U.S.C. 154(b) by 329 days.

(21) Appl. No.: 17/468,557

(22) Filed: Sep. 7, 2021

(65) Prior Publication Data

US 2023/0075246 A1  Mar. 9, 2023

(51) Int. Cl.
G06F 21/62 (2013.01)
G06F 16/22 (2019.01)
G06F 40/186 (2020.01)
G06F 40/42 (2020.01)

(52) U.S. Cl.
CPC ...... G06F 21/6245 (2013.01); G06F 16/2272 (2019.01); G06F 40/186 (2020.01); G06F 40/42 (2020.01)

(58) Field of Classification Search
CPC ............. G06F 21/6245; G06F 16/2272; G06F 40/186; G06F 40/42
See application file for complete search history.

(56) References Cited

U.S. PATENT DOCUMENTS

| | | | |
|---|---|---|---|
| 2011/0321122 A1* | 12/2011 | Mwangi | G16H 10/60 726/1 |
| 2015/0026760 A1 | 1/2015 | Lipman | |
| 2017/0177797 A1 | 6/2017 | Kurniawan et al. | |
| 2018/0069899 A1* | 3/2018 | Lang | G06F 40/186 |
| 2022/0269806 A1* | 8/2022 | Ben-Natan | G06F 21/6218 |

FOREIGN PATENT DOCUMENTS

WO  2018201009 A1  11/2018

OTHER PUBLICATIONS

International Application No. PCT/EP2022/070290, International Search Report and Written Opinion dated Oct. 25, 2022, 15 pages.

* cited by examiner

*Primary Examiner* — Matthew T Henning
(74) *Attorney, Agent, or Firm* — Perkins Coie LLP

(57) ABSTRACT

Systems and methods for policy management are described. In some implementations, a master policy management system can create a policy template in which all policies of a user can be built, monitored, and enforced. The master policy management system can create a taxonomy for the policy template and receive access and control settings for the policy template from the user. A user can generate policies in the policy template and the master policy management system can review and certify the policies based the accuracy of the policies. Once a policy is built, the master policy management system can review and certify the policy, provide a quality score for the policy, perform lifecycle management, record the policy use, and report alerts regarding the policy.

20 Claims, 7 Drawing Sheets

SYSTEMS AND METHODS FOR POLICY MANAGEMENT

TECHNICAL FIELD

The present disclosure relates to systems and methods for policy management.

BACKGROUND

Entities can build a policy to guide decisions in an entity. However, currently a single entity does not have the ability to build, monitor, and enforce their own policy. As such, there is an increased need for systems and methods that can address the challenges of modern-day policy building, policy governance, and policy mapping and delivery. Protecting sensitive data, such as personally identifiable information, is becoming an essential part of most enterprises, and there is a need for a secure platform where enterprises can build, monitor, and enforce policies for various entities.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
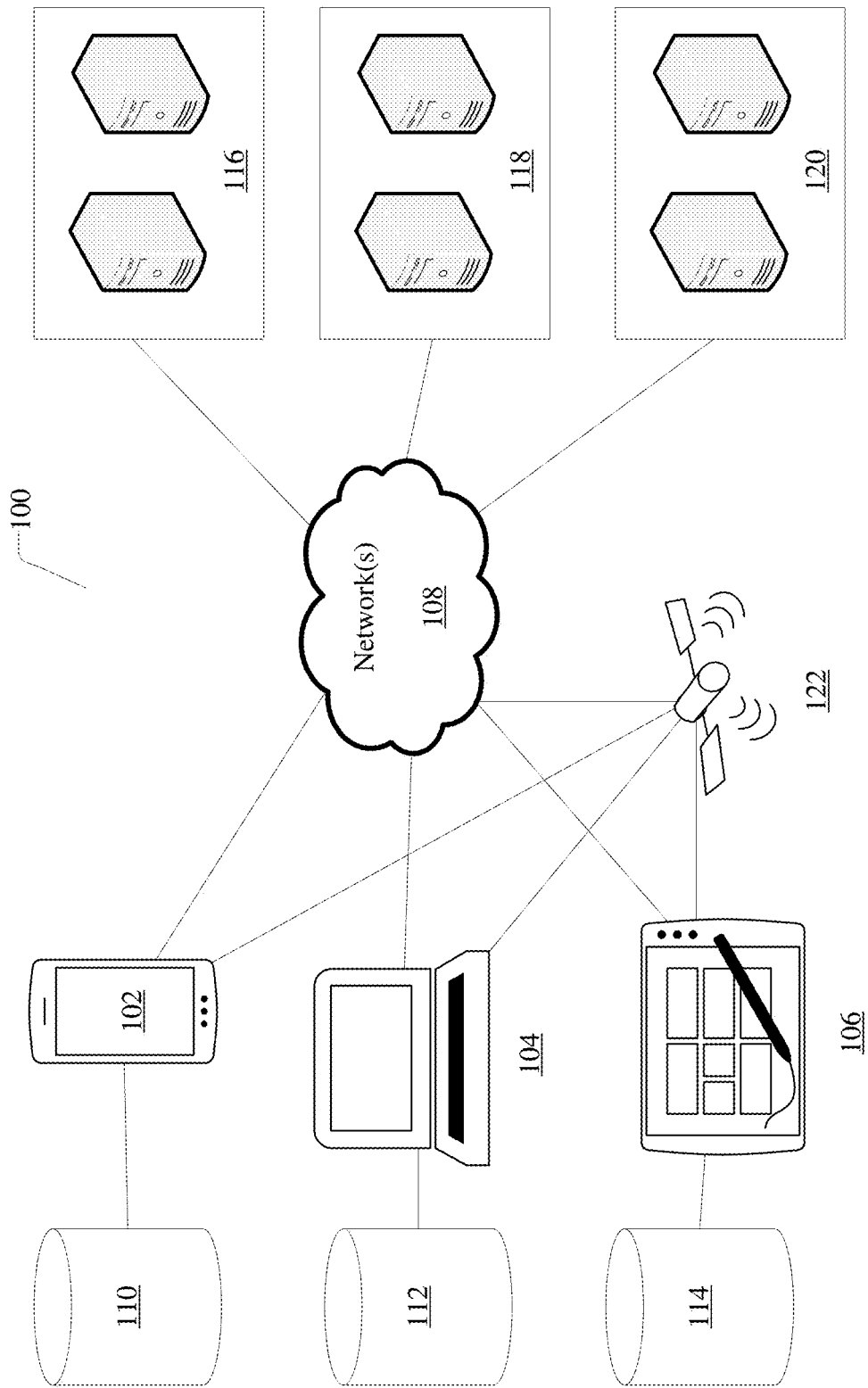
FIG. 1 illustrates an example of a distributed system for policy management, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed to systems and methods for policy management. In some implementations, a master policy management system can create a policy template (e.g., policy interface) in which all policies of a user (e.g., client, vendor, entity etc.) can be built, monitored, and enforced. The master policy management system can create a taxonomy for the policy template and receive access and control settings for the policy template from the user. A user can use the policy template to generate policies and the master policy management system can review and certify the policies based the accuracy of the policies. The master policy management system can attach metadata tags to the policy template based on type of data (e.g., sensitive data, such as personally identifiable information (PII)) or the description of an action (e.g., transforming, masking, or removing words) in the policy. Once a policy is built, the master policy management system can review and certify the policy, provide a quality score for the policy, perform lifecycle management, record the policy use, and report alerts regarding the policy. The master policy management system can deliver the policy to a policy broker for mapping and delivery. The policy broker can manage the policy and determine whether to enforce the policy. In some implementations, the master policy management system can receive a built policy, certify the built policy, and the policy broker deliver the policy to vendor platforms. The policy broker can monitor the policy to determine whether the policy should be enforced. In some implementations, the master policy management system can translate a vendor policy framework into a policy framework of the policy template. A policy broker of the master policy management system can map a translated policy framework to the vendor data platform and ensure a policy is enforced by delivering a published policy to a vendor platform and monitoring the policy for any violations.

Accordingly, the present disclosure provides a plurality of technical benefits including but not limited to: building, scoring, certifying, translating, and enforcing policies in a single platform; monitoring the enforcement of a policy; among other examples such as governing a policy's lifecycle, preventing the creation of duplicate and redundant policies across disparate data sources, and centralizing, maintaining, and supporting all policies across multiple data sources.

FIG. 1 illustrates an example of a distributed system for policy management, as described herein. Example system 100 presented is a combination of interdependent components that interact to form an integrated whole for building, governing, mapping and delivering policies. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain policy data. Client devices may download policy management software program via network(s) 108 that may be applied to the policy data. The client-specific data may be stored in local databases 110, 112, and 114. Once a policy is built, the policy data may be transmitted via network(s) 108 and/or satellite 122 to server(s) 116, 118, and/or 120. Server(s) 116, 118, and/or 120 may be third-party servers owned by a policy management Platform. In other examples, policy data may be stored in servers (in addition to or instead of local client devices and local databases) and transmitted from client servers to third-party servers via network(s) 108 and/or satellite 122.

In aspects, a client device, such as client devices 102, 104, and 106, may have access to one or more datasets or data sources and/or databases comprising policy data. In other aspects, client devices 102, 104, and 106, may be equipped to receive broadband and/or satellite signals carrying client-specific policy data. The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

To further elaborate on the network topology, client devices 102, 104, and/or 106 (along with their corresponding local databases 110, 112, and 114) may be owned by a policy vendor. The client devices 102, 104, and/or 106 may download a third-party software program to manage the policy data. The policy data from the policy vendor may be stored locally in local databases 110, 112, and/or 114. In other examples, the policy data may be stored in remote databases/servers 116, 118, and/or 120. In other examples, the policy data may be harbored in both local and external databases. After building, governing, or enforcing a policy, the policy vendor may transmit data via client device(s) 102, 104, and/or 106 that are configured to communicate with local databases 110, 112, 114 and servers 116, 118, and 120. The policy data from the policy vendor may be transmitted via network(s) 108 and/or satellite 122. The policy vendor data may be received by third-party servers. FIG. 1 depicts a network topology that may be used in a Customer Environment (i.e., client devices 102, 104, and/or 106 may belong to the Client Environment).

Figure 2:
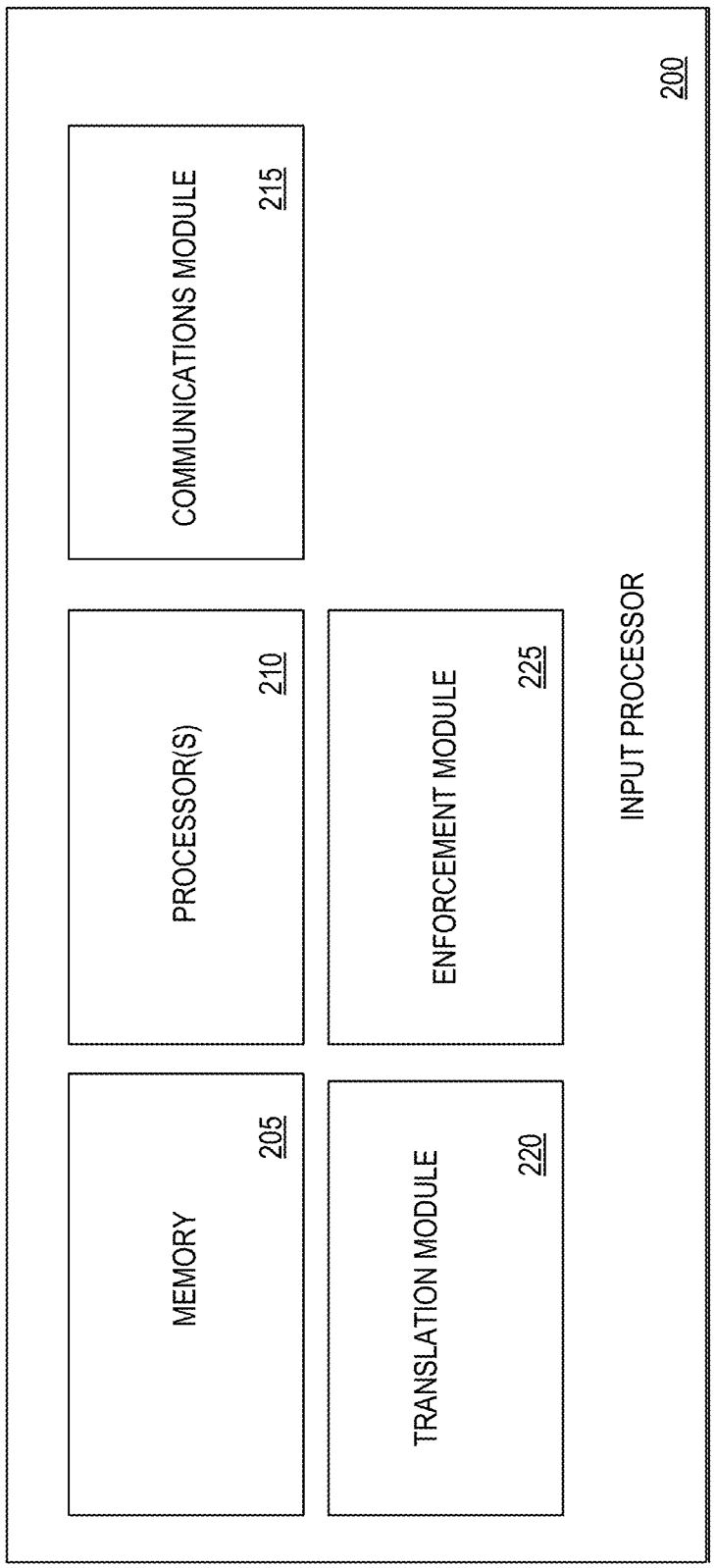
FIG. 2 illustrates an example input processor for operating a master policy management system, as described herein.

FIG. 2 illustrates an example input processor for implementing systems and methods for policy management, as described herein. Input processor 200 may be embedded within a client device (e.g., client devices 102, 104, and/or 106), remote web server device (e.g., devices 116, 118, and/or 120), and other devices capable of implementing systems and methods for managing policy data. The input processing system contains one or more data processors and is capable of executing algorithms, software routines, and/or instructions based on processing data provided by at least one client source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 2, the disclosed system can include memory 205, one or more processors 210, communications module 215, translation module 220, and enforcement module 225. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of translation module 220, and/or enforcement module 225, as well as communications module 215. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Communications module 215 is associated with sending/receiving information commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 215 sends information output by the translation module 220 and by enforcement module 225 and/or to client devices 102, 104, and/or 106, as well as memory 205 to be stored for future use. In some examples, communications modules may be constructed on the HTTP protocol through secure server(s) using the services.

Translation module 220 is configured to receive a policy and translate the language of the policy from the language of the client's system into the language of the master policy management system. For example, each client can have a different language that is used when building the policy, and the translation module 220 can translate the policy into a language so the master policy management system can monitor and enforce the policy. The translation module 220 can translate a policy from any platform. The translation module 220 can translate a vendor policy framework into a policy framework of the policy template.

Enforcement module 225 is configured to monitor and determine to enforce a policy based on the attributes of the policy. Enforcement module 225 can monitor the enforcement of a translated policy that the master policy management system is certifying. The enforcement module 225 can evaluate the use of a policy to detect violation of the policy. In some implementations, the enforcement module 225 generates an alert when a violation is detected. The enforcement module 225 can map a translated policy framework to the vendor data platform and ensure a policy is enforced by delivering a published policy to a vendor platform and monitoring the policy for any violations.

Figure 3:
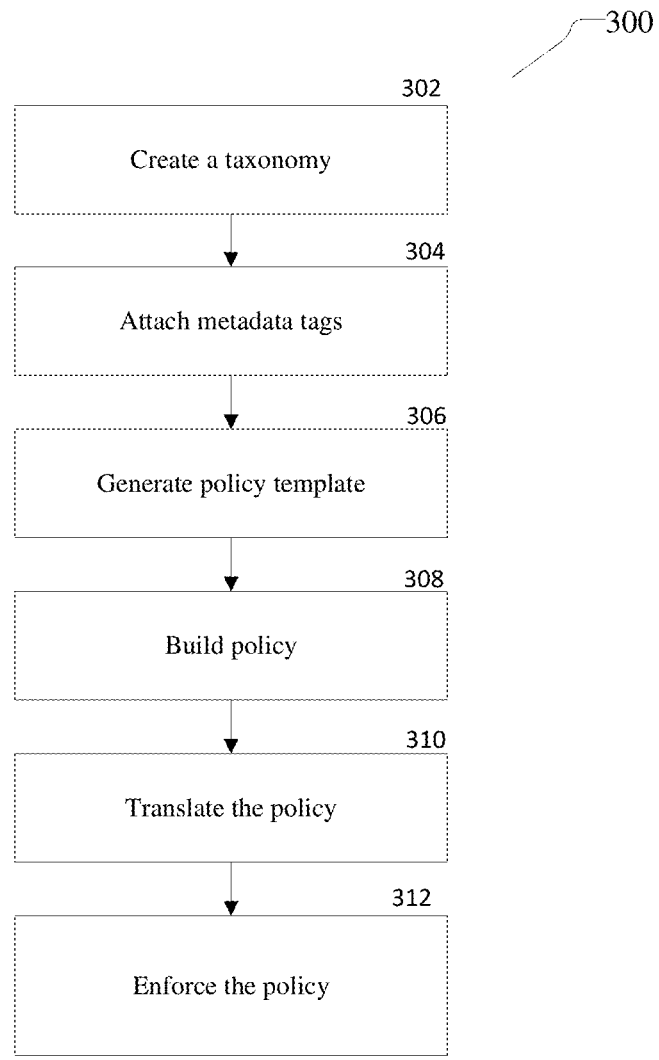
FIG. 3 illustrates an example method for policy management, as described herein.

FIG. 3 illustrates an example method 300 for policy management, as described herein. At step 302, method 300 can create a taxonomy for a policy template for generating and enforcing policies. The taxonomy is created by business users by establishing granular level data access controls for their business-critical data, categorizing data into buckets of sensitive restrictions, and writing filtering rules against each of them.

At step 304, method 300 can attach metadata tags to the policy template based on a type of data or description of an action in a user policy. Metadata tags ensures correct rules can be applied based on the taxonomy. At step 306, method 300 can generate the policy template for receiving and enforcing policies. The policy template can have characteristics for a policy, such as a policy name, type of data, taxonomy, region specific, a start and end date, and a version of the policy. The policy builder can attach meta data tags to the policy template to identify and mask/remove sensitive data.

At step 308, method 300 can build a policy in the policy template for specific use case and for processing data from a source. At step 310, method 300 can translate the policy into the language of the master policy management system for enforcement and certification of the policy. At step 312, method 300 can enforce the policy. Method 300 can enforce the policy while providing access to underlying data or source.

Figure 4:
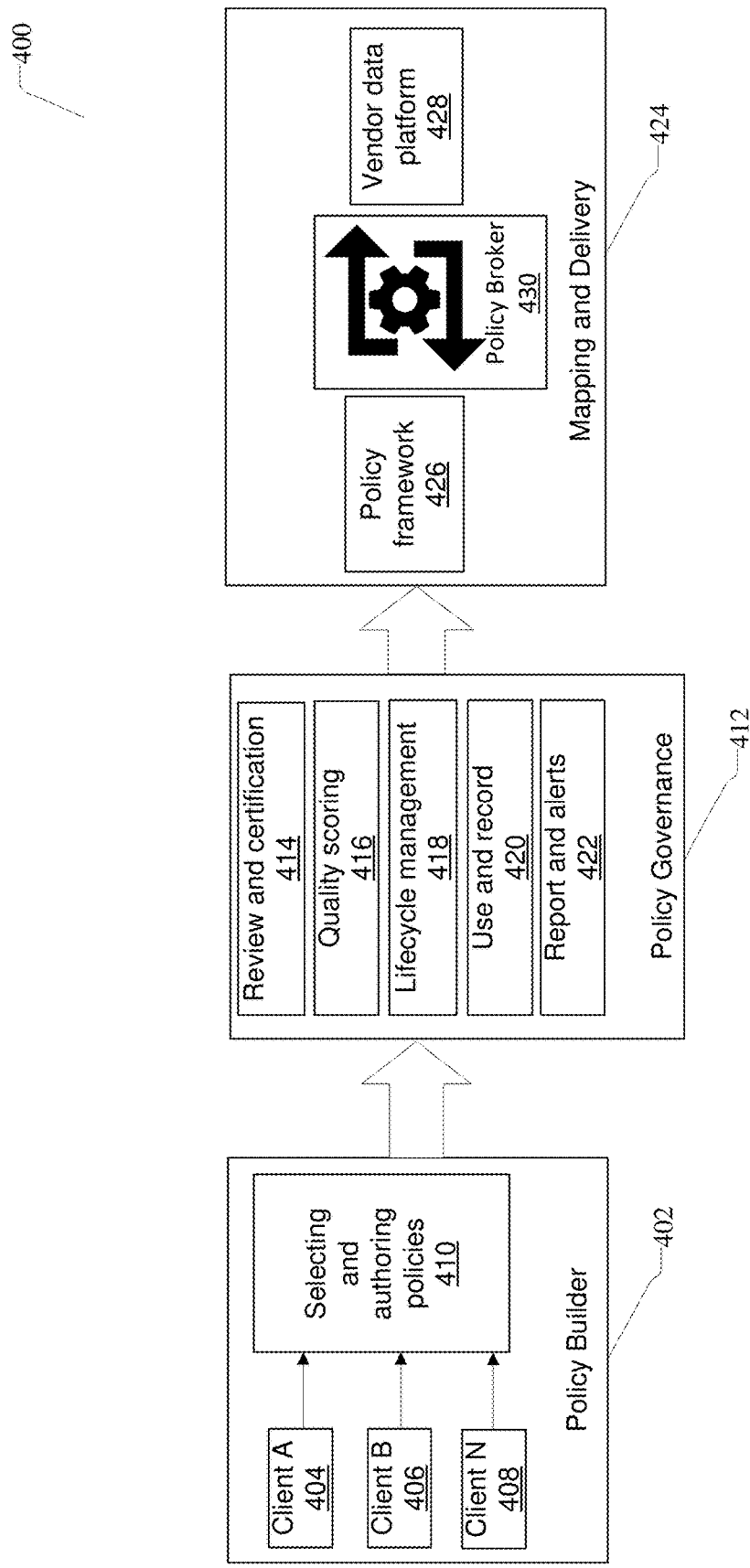
FIG. 4 illustrates an example of a policy management system that includes a policy builder, policy governance, and mapping and delivery.

FIG. 4 illustrates example 400 of a policy management system that includes a policy builder, policy governance, and mapping and delivery. The policy builder 402 can build a policy for the characteristics of any number of clients (e.g., client A 404, client B 406, and client N 408). Policy builder 402 can perform a stewardship process of selecting and authoring policies 410 by data assets, data domain, or data types. Additionally, the policy builder 402 can set-up user type access and controls for the policy. For example, to protect sensitive data (e.g., personally identifiable information (PII), such as a social security number), policy builder 402 can build a policy that if after an assessment of data, if any sensitive data is found in the data sources, the sensitive data is masked depending on the viewer. Each policy can include a taxonomy (e.g., structure of a policy) with various characteristics of a policy. The policy builder 402 can create a policy template in which any policy can be described by a client. The policy template can have characteristics for a policy, such as a policy name, type of data, taxonomy, region specific, a start and end date, and a version of the policy. The policy builder can attach meta data tags to the policy template to identify and mask/remove sensitive data. Additional details on policy building are provided in FIG. 5 and FIG. 6.

Policy governance 412 can perform reviewing and certification 414, quality scoring 416, lifecycle management 418, use and record 420, and reporting and alerts 422. In review and certification 414, policy governance 412 can review and certify a policy when the policy is accurate. Policy governance can manage and monitor the lifecycle of a policy, from the point at which it is created through the point at which it is distributed and monitored for data access activities.

In quality scoring 416, policy governance 412 can evaluate a policy and generate a quality score. The quality score considers the business context, rules & regulations, authors competency, revision status, and other relevant criterions with assigned weights to create a cumulative score between pre-defined range (e.g. 1-100). The quality score can indicate if a policy needs to be removed or updated.

In lifecycle management 418, policy governance 412 can manage a policy and track when the policy was enforced from the start to end date of the policy. Lifecycle of a policy can include characteristics like update frequency, review criterion, approvals, change triggers, and compliances. In use and record 420, policy governance 412 can monitor and record when a policy was built, when the policy ended, how often it was updated, or how often the policy was enforced. In reports and alerts 422, policy governance 412 can record all activity regarding the policy and create an alert when a policy is violated (e.g., stolen PII).

Mapping and delivery 424 can include a policy framework 426, a policy broker 430, and a vendor data platform 428 with a policy frameworks. Each vendor/client can present a policy framework customized to the vendors platform. The policy framework 426 can translate the vendor policy framework into a policy framework of the policy template. The policy broker 430 can map a translated policy framework to the vendor data platform 428. The policy broker 430 can ensure a policy is enforced by delivering a published policy to a vendor platform and monitoring the policy for any violations.

Figure 5:
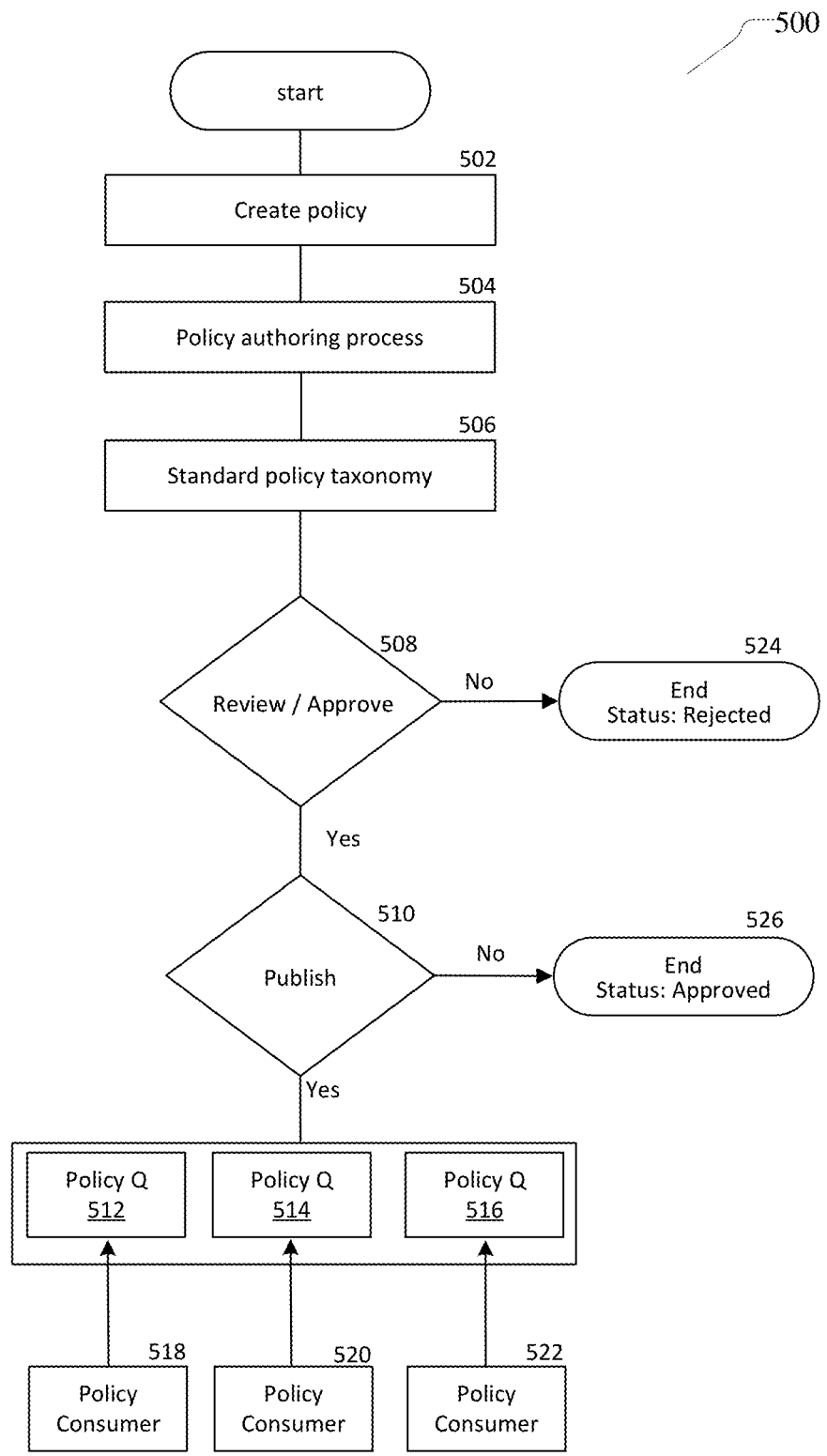
FIG. 5 illustrates an example method for policy management, as described herein.

FIG. 5 illustrates an example method 500 for policy management. At step 502, method 500 creates a policy. At step 504, method 500 performs the policy authoring process. For example, users who own data and wish to govern access to their data can create policies intuitively. At step 506, method 500 performs standard policy taxonomy. The standard policy taxonomy addresses governance guardrails by implementing flexible data access policies that may be applied to data from diverse source systems.

At step 508, method 500 reviews the policy and rejects or approves the policy. When the policy is rejected, at step 524, method 500 can change the status of the policy to rejected. When the policy is approved, at step 510, method 500 can determine whether to publish the policy. When the policy is not published, at step 526, method 500 can change the status of the policy to approved. When the policy is published, method 500 can grant the consumer access to the policy. For example, policy consumer 518 accesses policy Q 512, policy consumer 520 accesses policy Q 514, and policy consumer 522 accesses policy Q 516.

Figure 6:
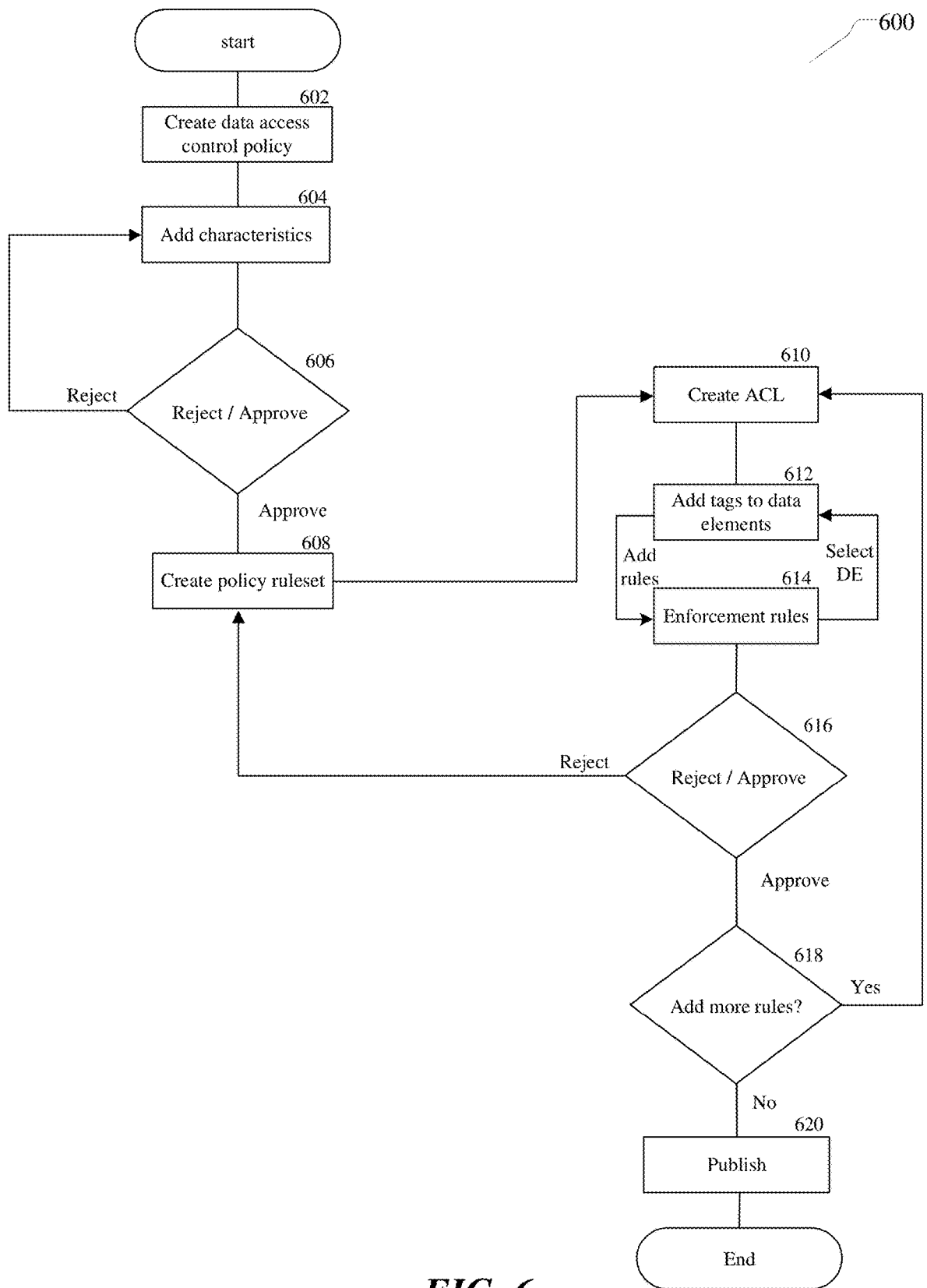
FIG. 6 illustrates an example method for a policy builder, as described herein.

FIG. 6 illustrates an example method 600 for building a policy. At step 602, method 600 can create a data access control policy (e.g., a fine-grained data access control policy). A fine-grained data access policy provides granular control over data access, such as who may access what data, what actions can be performed on that data, and who can author or alter access control policies. At step 604, method 600 can add characteristics to the policy. The characteristics can include a name, type, taxonomy, region, start date, end date, and version. At step 606, method 600 can review the policy and approve or reject the characteristics added to the policy. When method 600 rejects the characteristics, method can add and/or remove characteristics to the policy and review it again.

When the characteristics are approved, at step 608, method 600 can create a policy ruleset for the ruleset. The ruleset is based on the type of data and scope of the policy. At step 610, method 600 can create an access control list (ACL) for the policy. The ACL can include a role, a level, a scope (e.g., dataset), and data. At step 612, method 600 can add tags to the data elements in the policy. At step 614, method 600 can determine enforcement rules for the policy. The enforcement rules can tag data (e.g., sensitive data, such as PII) and/or transform data (e.g., tokenize, remove, or mask data) in the policy. In some implementations, adding tags to the data elements can add rules to the enforcement rules. In some implantations, method 600 can select a data element (DE) from the enforcement rules. At step 616, method 600 can review and approve or reject the policy. When the policy is rejected, method 600 can return to step 608 and create/update the policy ruleset. When the policy is approved, at step 618, method 600 can determine whether to add more rules (return to step 610) or at step 620 method 600 can publish the policy.

Figure 7:
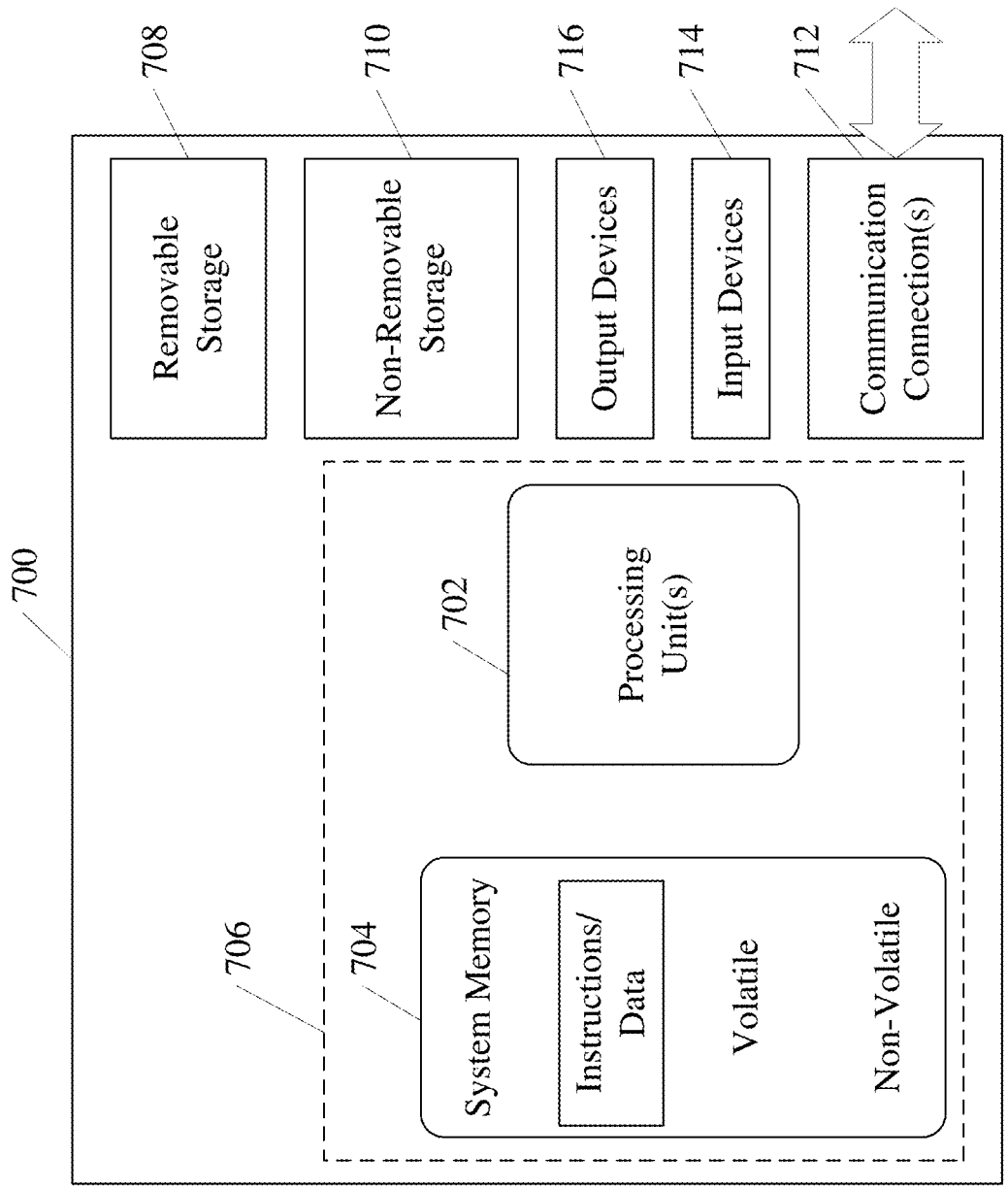
FIG. 7 illustrates one example of a suitable operating environment in which one or more of the present embodiments may be implemented.

FIG. 7 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable, 708, and/or non-removable, 710) including, but not limited to, magnetic or optical disks or tape. Similarly, environment 700 may also have input device(s) 714 such as keyboard, mouse, pen, voice input, etc. and/or output device(s) 716 such as a display, speakers, printer, etc. Also included in the environment may be one or more communication connections, 712, such as LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A computing system comprising:
one or more processors; and
one or more memories storing instructions that, when executed by the one or more processors, cause the computing system to perform a process comprising:
creating a taxonomy for a policy template for generating and enforcing policies;
receiving user type access and control settings for the policy template;
attaching metadata tags to the policy template based on a type of data or description of an action in a user policy;
generating the policy template for receiving and enforcing policies;
generating a policy in the policy template in a first language of a client;
translating the policy into a second language of a policy management system for enforcement and certification of the policy, wherein the first language of the client is different from the second language of the policy management system; and determining a quality score for the policy based on a combination of respective scores assigned to two or more of: a policy context, at least one policy rule or a policy revision status.

2. The computing system of claim 1, wherein an enforcement ruleset defines data tagging and transformation for the policy.

3. The computing system of claim 1, wherein the process further comprises:
scoring the policy based on policy use by a user during a time threshold.

4. The computing system of claim 1, wherein the metadata tags indicate personally identifiable information.

5. The computing system of claim 1, wherein the process further comprises:
monitoring the enforcement of the translated policy.

6. The computing system of claim 1, wherein the process further comprises:
certifying the policy based on comparing the translated policy to policies in a master policy database.

7. The computing system of claim 1, wherein the taxonomy is region specific.

8. A method comprising:
creating a taxonomy for a policy template for generating and enforcing policies;
receiving user type access and control settings for the policy template;
attaching metadata tags to the policy template based on a type of data or description of an action in a user policy;
generating the policy template for receiving and enforcing policies;
generating a policy in the policy template in a first language of a client;
translating the policy into a second language of a policy management system for enforcement and certification of the policy, wherein the first language of the client is different from the second language of the policy management system; and
determining a quality score for the policy based on a combination of respective scores assigned to two or more of: a policy context, at least one policy rule, or a policy revision status.

9. The method of claim 8, wherein an enforcement ruleset defines data tagging and transformation for the policy.

10. The method of claim 8, further comprises:
scoring the policy based on policy use by a user during a time threshold.

11. The method of claim 8, wherein the metadata tags indicate personally identifiable information.

12. The method of claim 8, further comprises:
monitoring the enforcement of the translated policy.

13. The method of claim 8, further comprises:
certifying the policy based on comparing the translated policy to policies in a master policy database.

14. The method of claim 8, wherein the taxonomy is region specific.

15. A non-transitory computer-readable storage medium including a set of instructions that, when executed by one or more processors, causes the one or more processors to perform operations comprising:
creating a taxonomy for a policy template for generating and enforcing policies;
receiving user type access and control settings for the policy template;
attaching metadata tags to the policy template based on a type of data or description of an action in a user policy;
generating the policy template for receiving and enforcing policies;
generating a policy in the policy template in a first language of a client;
translating the policy into a second language of a policy management system for enforcement and certification of the policy, wherein the first language of the client is different from the second language of the policy management system; and
determining a quality score for the policy based on a combination of respective scores assigned to two or more of: a policy context, at least one policy rule, or a policy revision status.

16. The non-transitory computer-readable storage medium of claim 15, wherein an enforcement ruleset defines data tagging and transformation for the policy.

17. The non-transitory computer-readable storage medium of claim 15, wherein the operations further comprise:
scoring the policy based on policy use by a user during a time threshold.

18. The non-transitory computer-readable storage medium of claim 15, wherein the metadata tags indicate personally identifiable information.

19. The non-transitory computer-readable storage medium of claim 15, wherein the operations further comprise:
monitoring the enforcement of the translated policy.

20. The non-transitory computer-readable storage medium of claim 15, wherein the operations further comprise:
certifying the policy based on comparing the translated policy to policies in a master policy database.

* * * * *